(12) United States Patent
Cleveland et al.

(10) Patent No.: US 7,579,941 B2
(45) Date of Patent: *Aug. 25, 2009

(54) TRAILER CARGO DETECTION USING ULTRASONIC TRANSDUCERS

(75) Inventors: Ronald Cleveland, Columbia, MD (US); Steve Wendler, Flower Mound, TX (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/335,226

(22) Filed: Jan. 19, 2006
(Under 37 CFR 1.47)

(65) Prior Publication Data

US 2006/0132306 A1    Jun. 22, 2006

Related U.S. Application Data

(63) Continuation of application No. 10/633,365, filed on Aug. 1, 2003, now Pat. No. 7,015,824.

(60) Provisional application No. 60/400,664, filed on Aug. 1, 2002.

(51) Int. Cl.
G08B 21/00    (2006.01)

(52) U.S. Cl. .................. 340/431; 340/501; 340/602

(58) Field of Classification Search ............. 340/686.1, 340/686.16, 943, 991, 666, 431, 506, 566, 340/601, 602, 501, 522, 523, 693.6; 367/93, 367/94; 180/167, 169; 702/155; 701/1
See application file for complete search history.

(56) References Cited

U.S. PATENT DOCUMENTS

| | | | |
|---|---|---|---|
| 4,219,740 A | 8/1980 | Little | |
| 4,728,922 A * | 3/1988 | Christen et al. | 340/991 |
| 5,042,015 A | 8/1991 | Stringer | |
| 5,422,861 A | 6/1995 | Stringer et al. | |
| 5,598,141 A | 1/1997 | Grasmann et al. | |
| 5,917,433 A | 6/1999 | Keillor et al. | |
| 5,917,776 A | 6/1999 | Foreman | |
| 6,279,946 B1 * | 8/2001 | Johnson et al. | 280/735 |
| 6,298,009 B1 | 10/2001 | Stringer | |
| 6,437,702 B1 | 8/2002 | Ragland et al. | |
| 6,738,697 B2 * | 5/2004 | Breed | 701/29 |
| 6,922,622 B2 * | 7/2005 | Dulin et al. | 701/45 |
| 2006/0167595 A1 * | 7/2006 | Breed et al. | 701/1 |
| 2006/0220842 A1 * | 10/2006 | Breed | 340/539.13 |

* cited by examiner

Primary Examiner—Van T. Trieu
(74) Attorney, Agent, or Firm—Drinker Biddle & Reath LLP

(57) ABSTRACT

A cargo detector for use in a trailer that includes an ultrasonic transducer for covering the entire interior area of the trailer. In particular, the cargo detector has three modes including short range, long range, and proximity range, and can detect cargoes located flush against a front or rear wall of the trailer.

5 Claims, 11 Drawing Sheets

TRAILER CARGO DETECTION USING ULTRASONIC TRANSDUCERS

RELATED APPLICATION

This application is a continuation of U.S. application Ser. No. 10/633,365, now U.S. Pat. No. 7,015,824, filed on Aug. 1, 2003, which claims the benefit of U.S. Provisional Application No. 60/400,664, filed Aug. 1, 2002. The entire teachings of the above application and patent are incorporated herein by reference.

BACKGROUND OF THE INVENTION

Mobile asset location tracking systems have been available since the 1980s. These systems typically place a locator sensor, such as a Global Positioning System (GPS) receiver, and some sort of wireless data communicator system, such as a cellular telephone, to periodically transmit its location to a central dispatch or controller. Knowing the location of trailers has proven to be extremely valuable to trailer operations. Initially, this technology was primarily utilized for exception management, but it has since proven to also be valuable for improving the efficiency of trailer utilization.

One key piece of information used in optimizing trailer utilization is to know when and where a trailer was loaded, and when and where the trailer was unloaded. Until recently, trailer operations relied on the accuracy of reports from drivers for this information, but historically, this method of reporting is often inaccurate.

Object detection techniques utilizing ultrasonic transducers has also been available for years, but the application of this invention for cargo detection in a trailer had not been exploited until just recently. Ultrasonic detectors address a key issue in trailer cargo detection in that the sensor can be mounted in one location, and the detection signal originates and returns to that same location. Consequently, the installation and cost is manageable.

SUMMARY OF THE INVENTION

Cargo detection in a trailer is a difficult accomplishment, primarily because of the obtuse dimensions of the trailer. A standard trailer has internal dimensions of roughly 53 feet long, but only 8 feet wide and 9 feet tall. When dealing with ultrasonic signals in a closed space with primarily metal walls, reflections will be numerous. The placement of the sensors, as well as the processing of return signals must be sufficiently sensitive to detect the presence of cargo in the trailer, but immune to the false returns generated by reflections of the walls, floor and ceiling. There exists a need for a cost effective system for detecting the presence of cargo anywhere within a standard 53 foot trailer.

The cargo detector of the present invention includes at least one ultrasonic transducer for covering the entire area of the trailer to detect the presence of an object, especially the area near the ends of the trailer. In particular the cargo detector includes short range, long range, and proximity range modes.

According to one aspect of the present invention, a cargo trailer detector consists of a sensor mounted along one wall of the trailer, a trailer tracking control unit connected to the sensor, and a power source electrically connected to the sensor. The sensor includes a pair of ultrasonic transducers that have multiple operation modes with different ranges. The control unit controls the sensor and receives data from the sensor.

The long range operation mode scans the area adjacent a distal end of the cargo trailer. The area scanned y the long range mode may extend from 10 to 63 feet and may cover the loading door wall of the cargo trailer.

The cargo detector may also include an amplifier for amplifying signal of one or more ultrasonic transducers to make up for atmospheric absorption due to sensed atmospheric conditions. Such conditions may be temperature air and/or humidity.

The area scanned by the short range mode of the cargo sensor, nearer to the sensor itself, may extend from 4 to 20 feet and may include the floor of the cargo trailer.

Scanning in the proximity mode may be performed continuously to detect presence of any objects in the area from 0 to 4 feet from the sensor. The same transducer as used for the short range mode may also be used for the proximity mode, operating in the proximity mode between periodic short range mode scans. The transducer may be operating in lower power mode when in the proximity mode, as compared to that when in the short range mode.

The sensor may be programmed to determine presence or absence of objects in the cargo trailer and that information may be transmitted to a central location using a communications control unit connected to the trailer tracking control unit.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
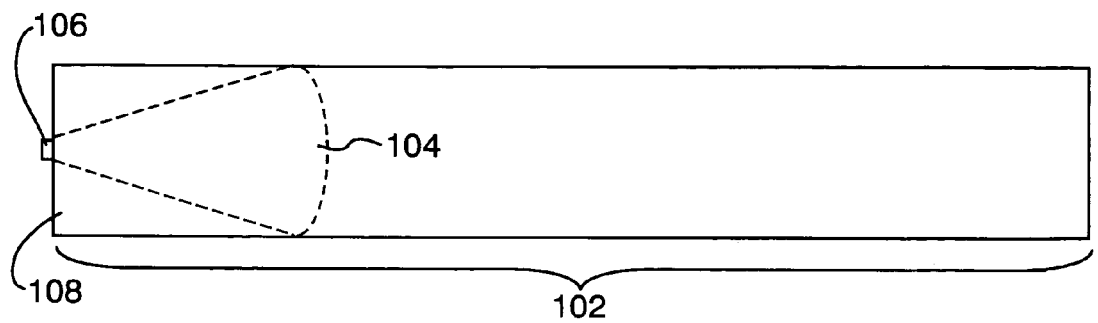
FIG. 1 illustrates a nose mounted cargo detector unit known in the prior art.

FIG. 1 illustrates an ultrasonic sensor detection unit 106 mounted at the nose end 108 of the trailer 102, as is known in the prior art. Although mounting the sensor detection unit at the nose 108 is very effective for scenarios when the load is present in the nose of the trailer, this approach is largely ineffective for detecting the presence of cargo beyond about 10-20 feet from the nose, as illustrated by range 104 of the sensor unit 106.

The nose-mounted units perform well for the short distances that they cover. The primary disadvantage of the nose-mounted units is that only a small portion of the cargo space is being examined. Depending upon weight distribution, a small load may be positioned anywhere in the trailer space, and thus may be not detectable using a nose-mounted sensor unit 106. Trailer operating companies may be dissatisfied with a cargo detection sensor that only samples the nose end of the trailer.

Figure 2:
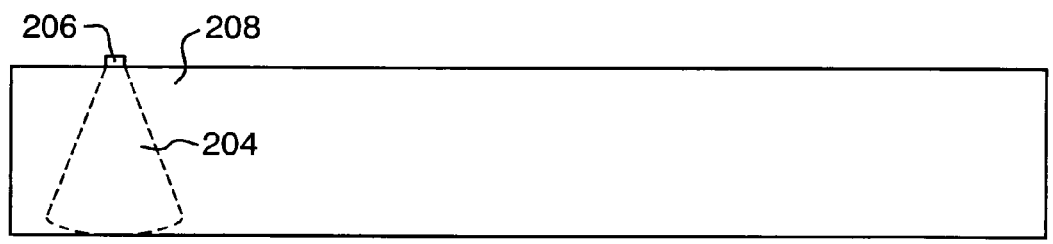
FIG. 2 illustrates a single roof-mounted unit used in the prior art.

As illustrated in FIG. 2, in other prior art approaches, the detector 206 may also be mounted on the ceiling 208 of the trailer. This positioning has the advantage of having an easily discernible reflection back from the floor when the trailer is empty. The positive response of an empty trailer is useful because it has a definitive signature that is more easily distinguished from a loaded trailer. However, the ceiling 208 is not a prime installation location for trailers. The ceiling of a trailer typically has only one wall. Generally, it is not practical or allowed to have holes in the surface of the ceiling. The cabling required for power and the interface may become cumbersome, which also adds to installation time and cost. Furthermore, the range 204 of the ceiling-mounted detector 206 also may cover only a small portion of the available trailer space.

Figure 3:
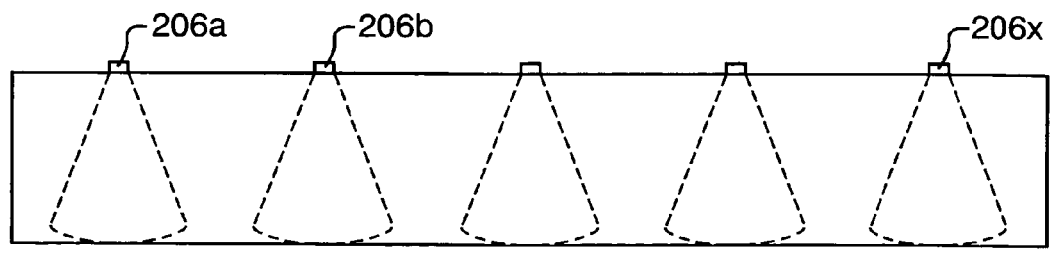
FIG. 3 illustrates multiple ceiling-mounted sensors used in the prior art.

FIG. 3 illustrates another prior art detection system where cargo sensors 206 are located down the length of the trailer. This approach realizes extremely robust performance for cargo detection. Each unit is only responsible for detecting objects within 9 feet of its location, which keeps the detection logic very simple. But the cost associated with a multiple unit approach such as this is also very high. In addition, installation of these units and the cabling that must be run from each unit to the host hardware is cumbersome.

According to one embodiment of the present invention, a single nose-mounted cargo detector is used to monitor the whole trailer. The cargo detector may use three different detection modes to cover three different ranges within the cargo compartment.

Figure 4:
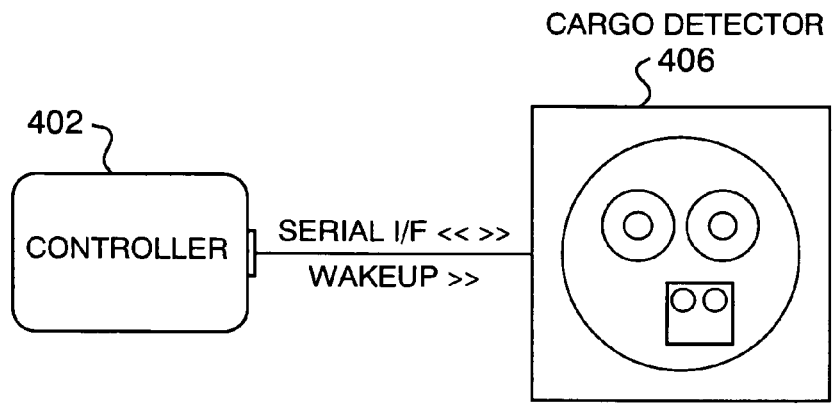
FIG. 4 illustrates a cargo detector and its interface to a controller according to the invention.

As illustrated in FIG. 4, the cargo detector (also called a sensor) 406 may be controlled by a communications controller 402, which may be in communication with a central system using a wireless network. The communications controller 402 may be employed to receive commands for testing and/or modifying settings on the cargo detector 406 and for transmitting information from the sensor to the central office. The communications controller 402 may be connected to the sensor 406 using a wired or wireless connection.

As will be described in greater detail below, a single control line may be utilized to switch the cargo detector on for the duration of each measurement period. In this way, the cargo detectors sampling period is controlled by the host application.

Figure 5:
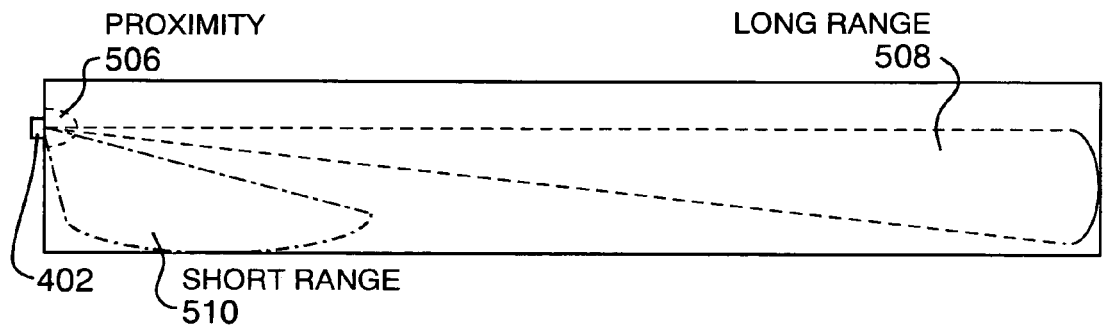
FIG. 5 illustrates range of a nose-mounted cargo detector according to one embodiment of the invention.

FIG. 5 illustrates the range modes of a nose-mounted cargo detector 406 according to one embodiment the present invention.

The cargo detector 406 is configurable for a variety of cargo containers. For example, the cargo detector may be designed to be mounted at the nose end of the trailer, mounted about 7' above the floor and centered between the two side walls.

The cargo detector uses multiple ultrasonic transducers to detect the presence of objects within its detection path. In a preferred embodiment, the cargo detector has three modes of operations, wherein each mode is responsible for detection objects in a different space within the trailer. The three modes are:

Short Range Mode
Long Range Mode
Proximity Mode

The three modes are each optimized for a specific detection range. The combination of these three modes makes the detector effective across the entire 53' of a trailer.

The short range mode is designed to handle the condition when a load is placed at the nose of the trailer. It is effective for loads in the short range 510 of 4' to 20'. For this mode, a pair of 40 kHz transducers, one for transmit and one for receiver, may be used. The transducers are pointed downward toward the floor of the trailer. For this mode, the return response of the floor is known and expected for an empty trailer. A return that is significantly different is determined to be due to cargo. The cargo detector returns the distance to the object as its measurement. The short range sensors may be arranged so as to sweep the whole floor area from one side wall to another.

A long range mode is designed to handle the condition when a load is placed anywhere down the length of the trailer. It is effective for loads in the range 508 of 10' to 63'. For this mode, a pair (receive and transmit) of 25 kHz transducers is used. The transducers are angled down slightly to traverse the entire length of the trailer, so that energy reacts the back door 512 area. The transducers are preferably mounted at the base of parabolic cones within the unit 406, to focus the ultrasonic energy and extend their range. Furthermore, to ensure accuracy down the length of a 53' trailer across all environmental conditions, the long range mode utilizes readings of the air temperature and humidity to compensate for the attenuation and propagation properties of the air at the time of the measurement. Compensating for atmospheric absorption is discussed further in connection with FIGS. 9-12.

The cargo detector returns the distance to the object as its measurement. In that the cargo detector routinely detects the back wall 512 of the trailer, the length of the trailer is known to the host application to discriminate between a load and an empty trailer. This discrimination may be accomplished, for example, by collecting numerous test samples of what a reflection from an empty trailer looks like and a comparative reflection for a trailer containing cargo. The sensor electronics may then be configured to make a determination of whether any objects are located in the trailer based on the learned knowledge about different reflective patterns.

The third, proximity mode is designed to handle the condition when a load is placed within a few feet of the sensor, or even flush against the nosewall. This is a critical mode of the cargo detector, in that a load placed against the detector will dampen any pings and defeat the distance measuring modes of the short range and long range sensors. It is effective from 0" (object placed flush against cargo detector) to 4'. In this mode, the 40 kHz transducers are utilized in a low power mode, but allowed to run continuously. The presence of a return signal indicates that there is an object within its range. In this case, the detector returns the magnitude of the return signal as its measurement.

The control unit (see FIG. 7) contains a microcontroller and associated circuitry that powers up the cargo detector on a predetermined schedule, and commands a collection of measurements using the three modes identified above. The detectors return the three measurement values, and the control unit uses those measurements to make an assessment as to whether the container space is loaded or empty. For the control unit application, there is additional filtering that is done in the logic to ensure a load change has occurred.

Because any detection algorithm can yield marginal results, the cargo detector is designed to perform its measurements using one of two different sets of thresholds. With conventional cargo detection, a load that is marginally detectable may yield inconsistent measurement results. This can cause the sensor to oscillate between loaded and empty until the load status changes.

By utilizing two sets of thresholds, the control unit can tell the cargo detector which set of thresholds to use based on the current assessment of whether the trailer is loaded or empty. This provides a guard band between loaded and empty that must be crossed to reverse the existing measured state. This adds considerable reliability to the load determination.

With the basic design as discussed in this disclosure, the cargo detector achieves better than 98% detection accuracy of load and empty events.

Figure 6:
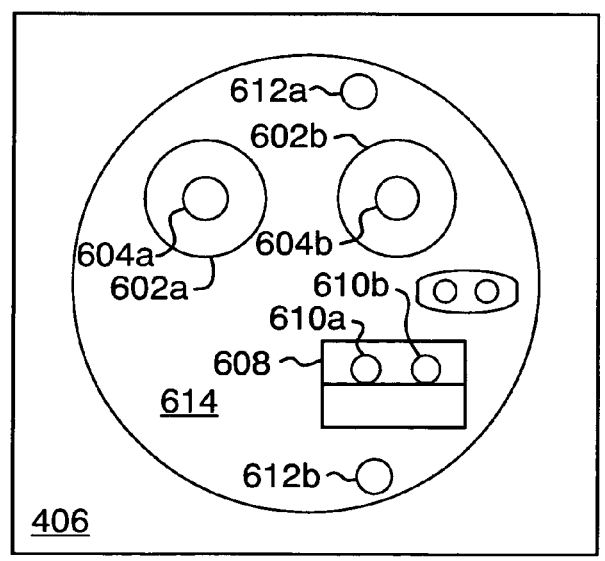
FIG. 6 is a front view of the nose-mounted cargo detector according to one embodiment of the present invention.

FIG. 6 shows a front view of the cargo detector 406 assembly according to one embodiment of the present invention. As discussed above, the cargo detector 406 has at least two pairs of ultrasonic transducers, short range 610a and 610b, and long range 604a and 604b, each consisting of an ultrasonic transmitter and a detector. The long range transmitter and detector 604 a-b are mounted within elliptic cones 602a-b to improve the efficiency of the sensor.

The atmospheric conditions inside the trailer may affect the accuracy of the measurements because they may change the amount of absorption of the ultrasonic signal. For example, humidity of the temperature may affect absorption of the ultrasonic signal, while the temperature of the air may affect propagation time of the signal, which may also have effect on the distance measurements that are used to determine whether there is an object present in the cargo trailer. The long-range sensor signal may be adjusted and amplified in order to compensate for the atmospheric conditions. There are holes 612a-b in the face plate of the sensor 406 to promote airflow through the case in such a way as to draw the air across the temperature and humidity sensors. The temperature and humidity sensors are used to judge the atmospheric absorption.

The short range transmitter and detector 610a-b do not need to be mounted within cones because the range of their operation is limited compared to the long range transducer. In an alternative embodiment of the invention, the short-range transducer may likewise be mounted within the elliptic cone to improve power efficiency.

In one embodiment of the invention, the short range transducers 610a-b are mounted facing the floor of the trailer. In an alternative embodiment of the invention, the angle of mounting of the short-range ultrasonic transducer may be varied based on the height at which the sensor is positioned.

The short range transducer may also be employed to operate in the proximity mode to provide cargo detection within the short range distances. The sensor controller may set the short range transducer to operate at lower power levels when it is in the proximity mode. The proximity mode detection may be performed continuously, while the short-range detection may be performed periodically at predetermined time intervals. The low gain proximity mode operates by simultaneously transmitting and receiving signals and determining if reflection is present.

The cargo detector may be mounted between the inside and outside walls of the nose end of the trailer, such that the front panel 640 of the sensor 406 is flush with the inside wall of the trailer. In an alternative embodiment of the invention, a different mounting position may be used, as determined by one skilled in the art.

Figure 7A:
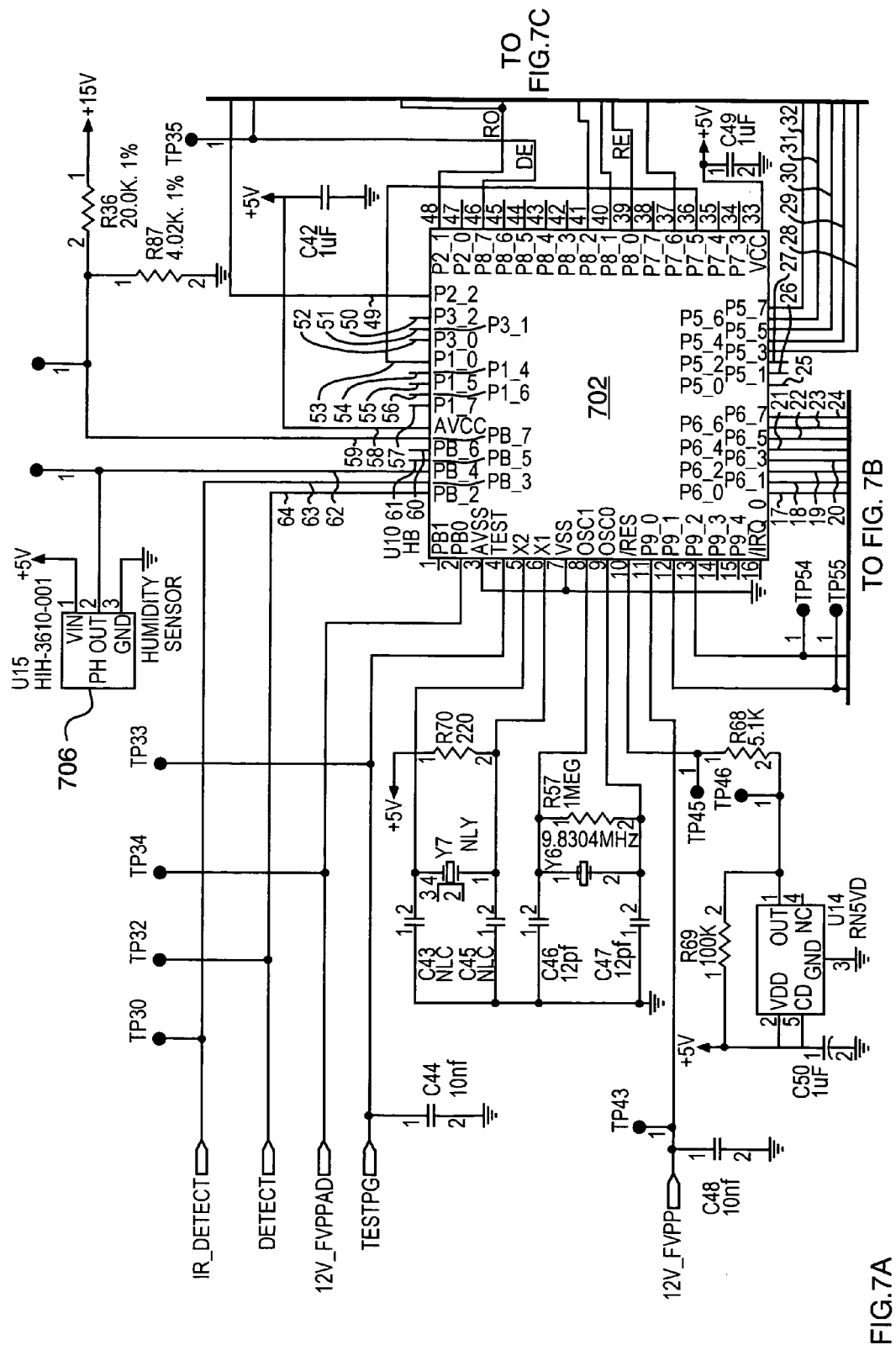
FIGS. 7A-7C are circuit diagrams illustrating atmospheric sensors.
Figure 7B:
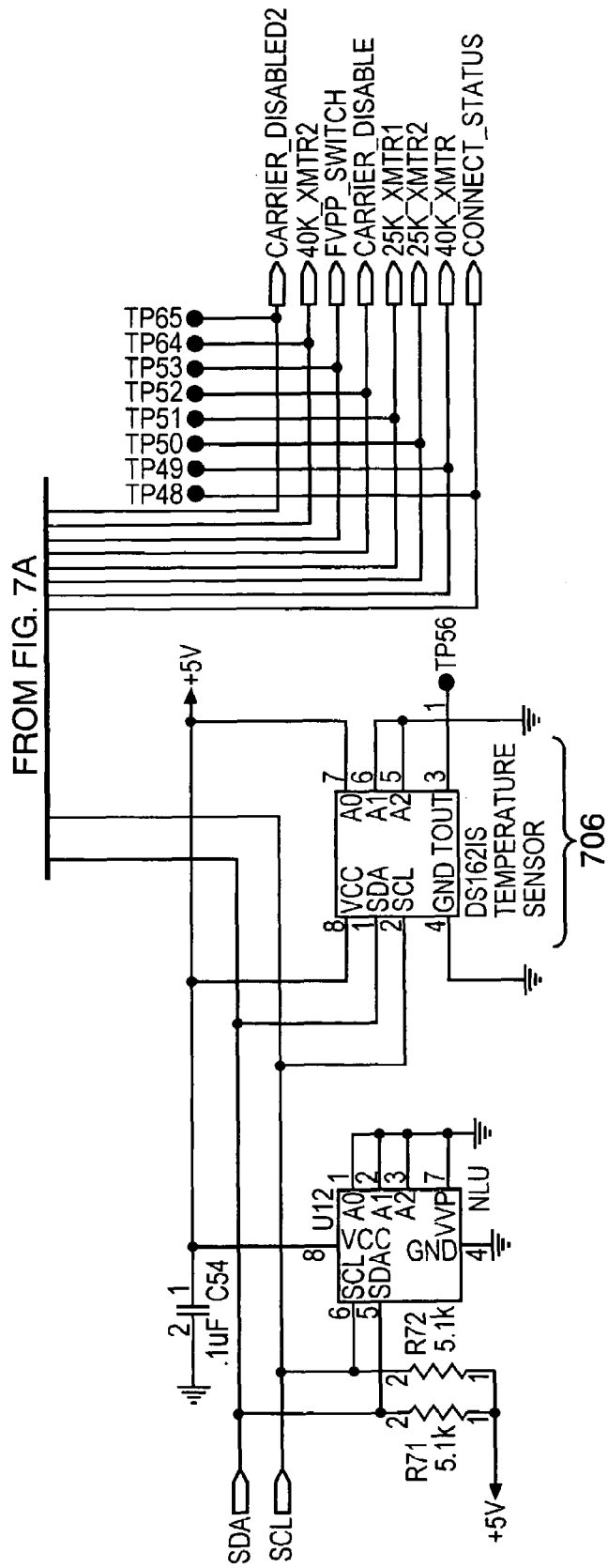
Figure 7C:
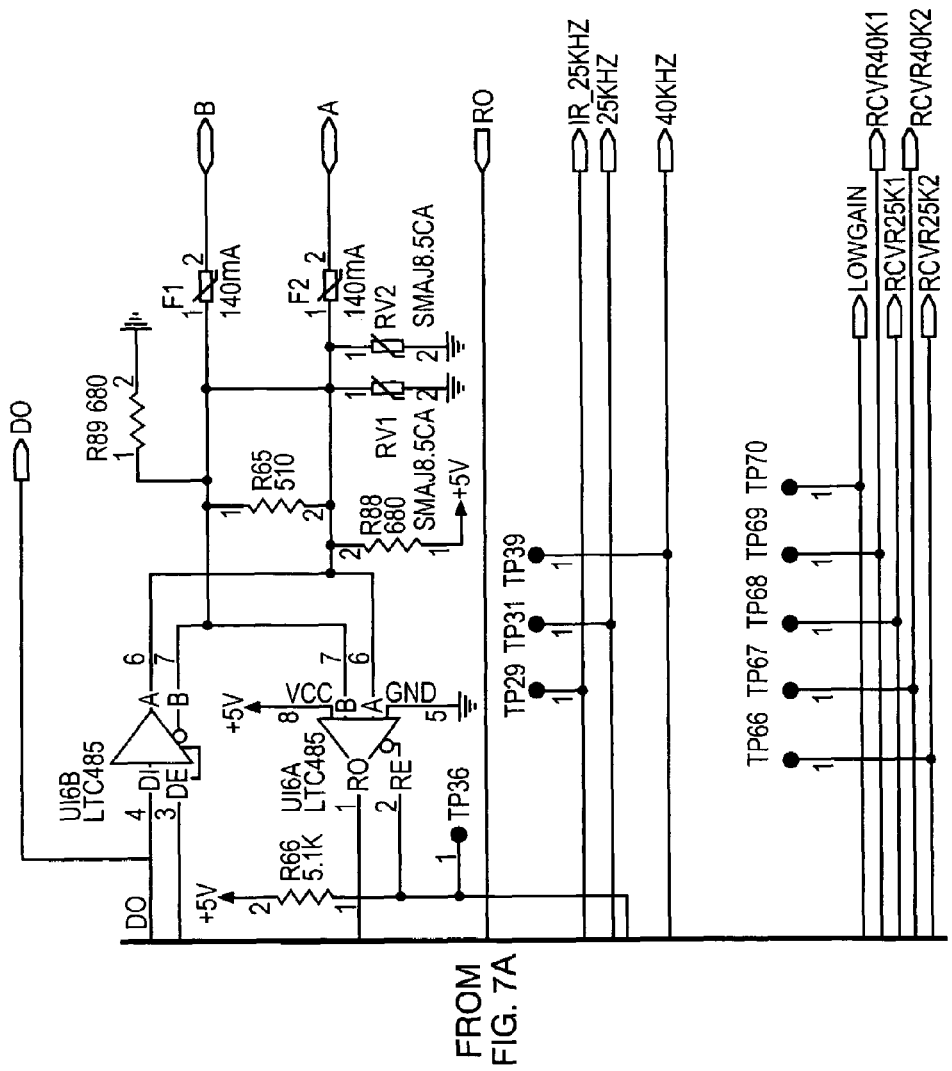

The cargo detection module 406 may be controlled by control circuit 902 (see FIG. 7). A microprocessor (microcontroller) 702 is the main component of the control circuit 902, and connected to it are humidity and temperature sensors 706 and 704, correspondingly, and various other amplifier and power components.

Figure 8A:
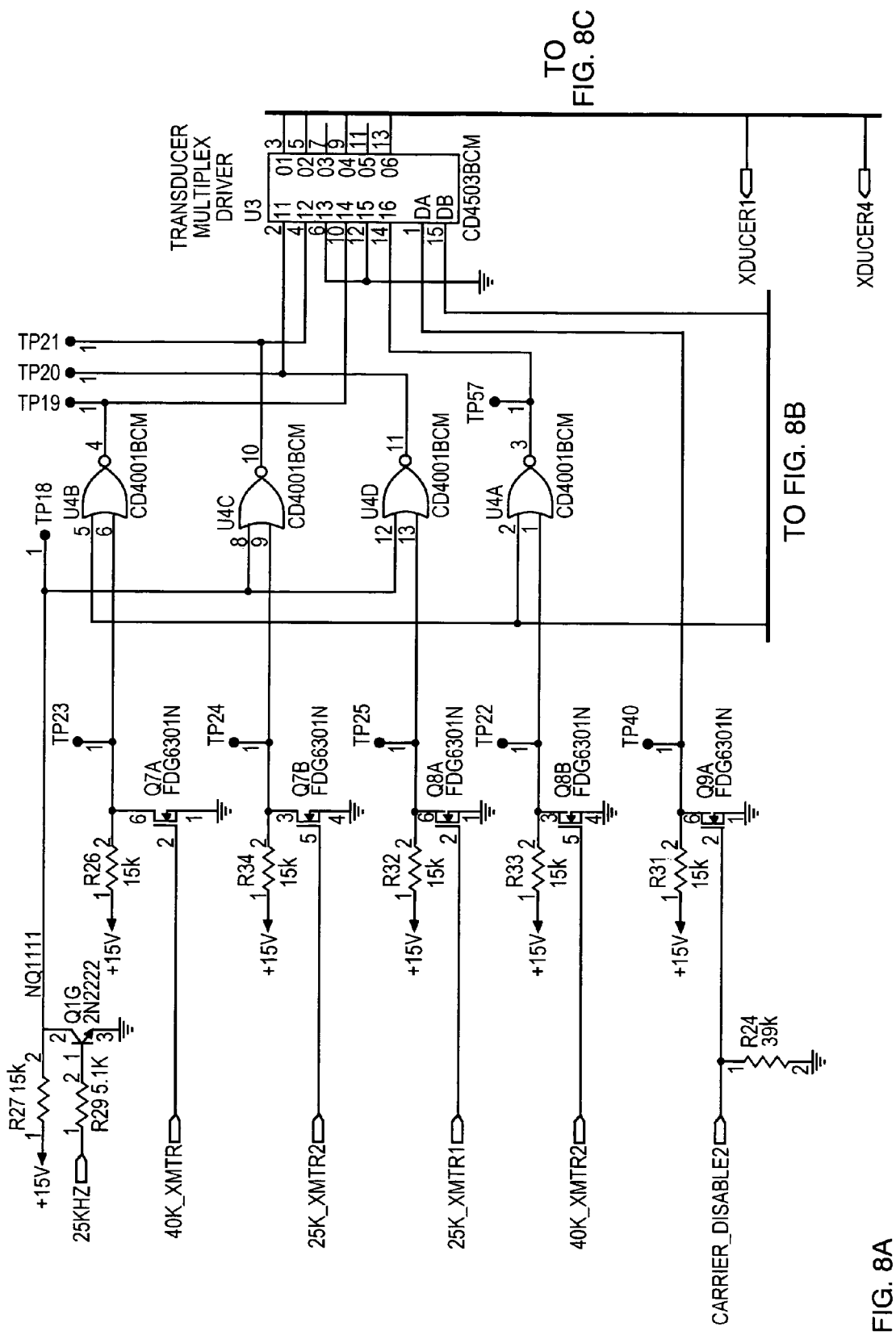
FIGS. 8A-8C are circuit diagrams illustrating a gain compensation module.
Figure 8B:
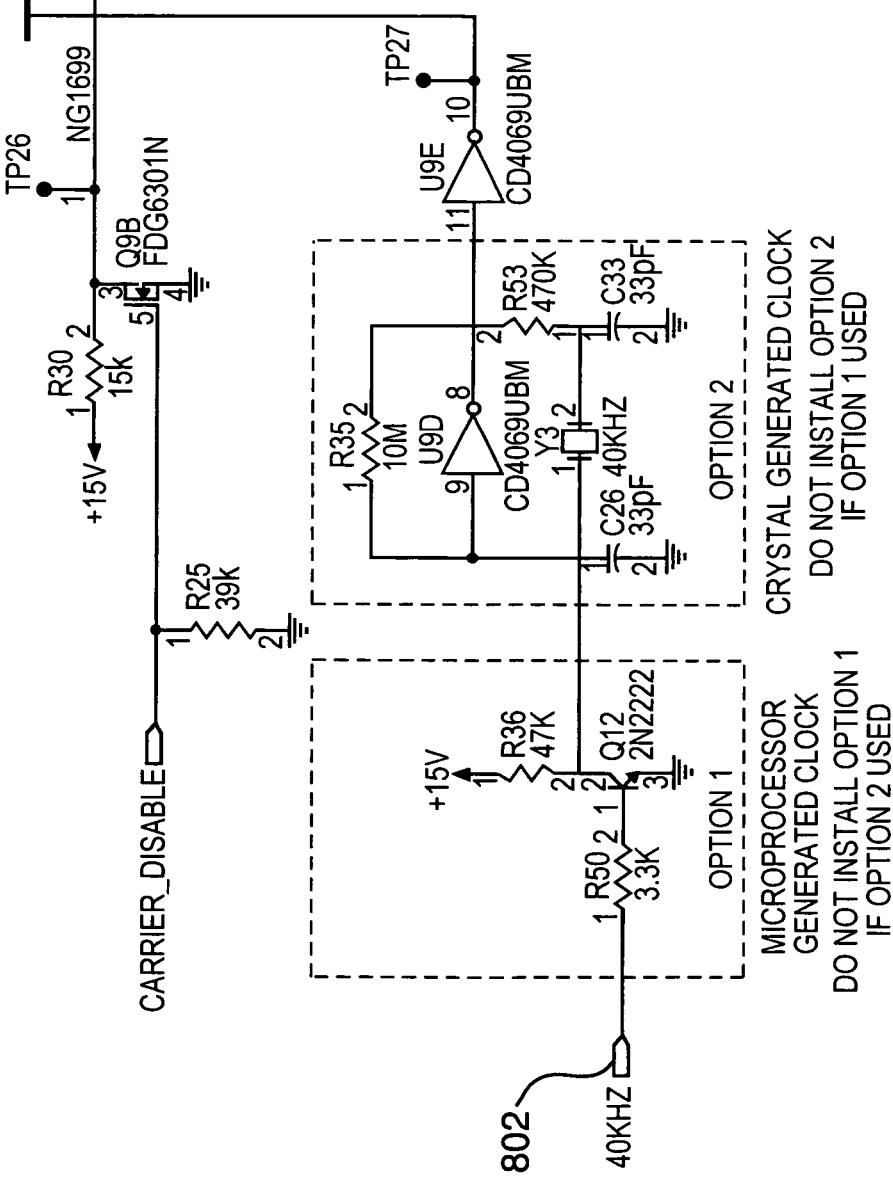
Figure 8C:
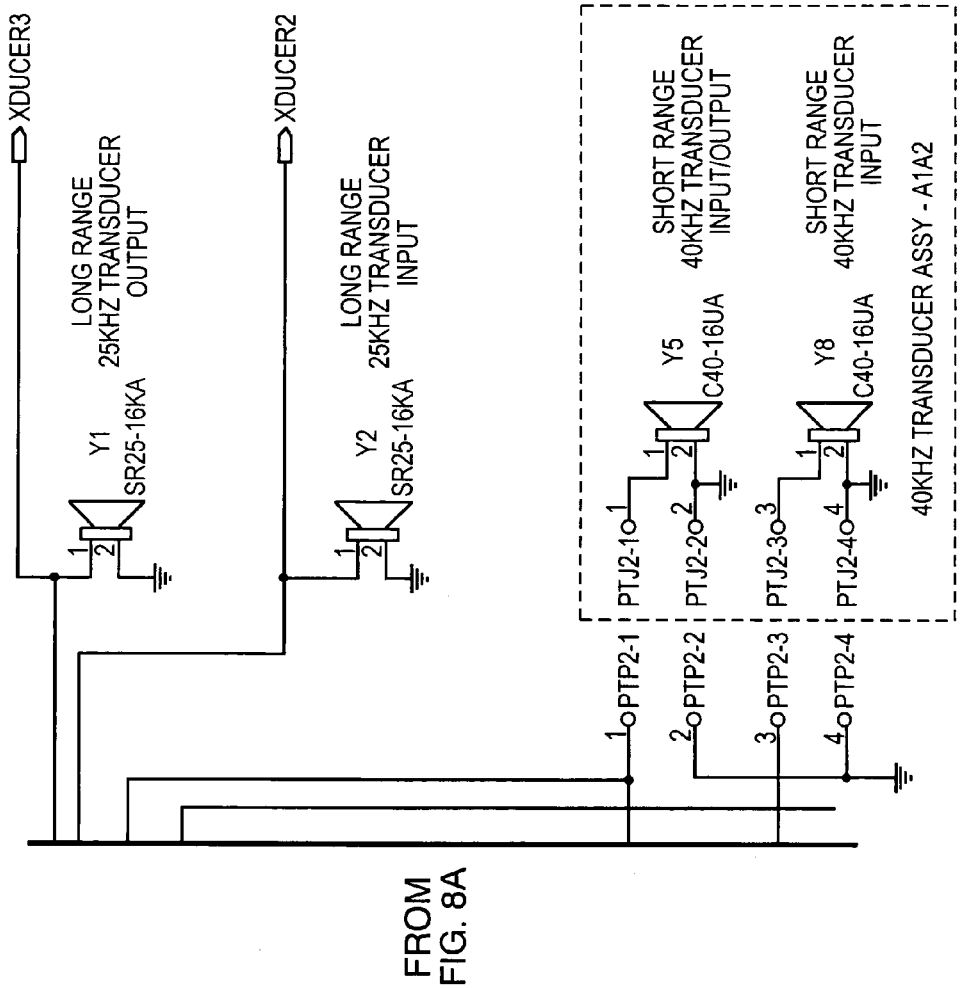

Illustrated in FIG. 8 is the electronics for gain compensation for the atmospheric absorption. The transducer signal of interest is selected from the input signal 802 using a series of Field Effect Transistors (FETs). The signal passes through three stages of fixed gain amplification before going through a fourth, variable-gain stage. The potentiometer is used to set the resistor divider on the feedback path on the fourth stage, which allows for setting the gain of the fourth stage in the range between 6 db and 44 db.

The cargo sensor may be operated in one of the following modes: measurement mode, testing mode, and reprogram mode. In the measurement mode, the sensor sequences through all possible measurements and then provides a short binary packet with the results of all of the measurements. This packet may then be sent to the controller 402.

In the terminal mode, the sensor provides a menu interface, using which a user can program the sensor for individual tests or comprehensive measurement sequences. This interface may be run, for example, on a terminal-based host, such as a computer running HyperTerminal.

In the reprogram mode, the startup code erases and reprograms the runtime segment of the sensor controller based on a byte stream received from the communication interface. Such byte stream may be sent, for example, from the central office using the controller 402, or from the controller 402 directly.

Figure 9:
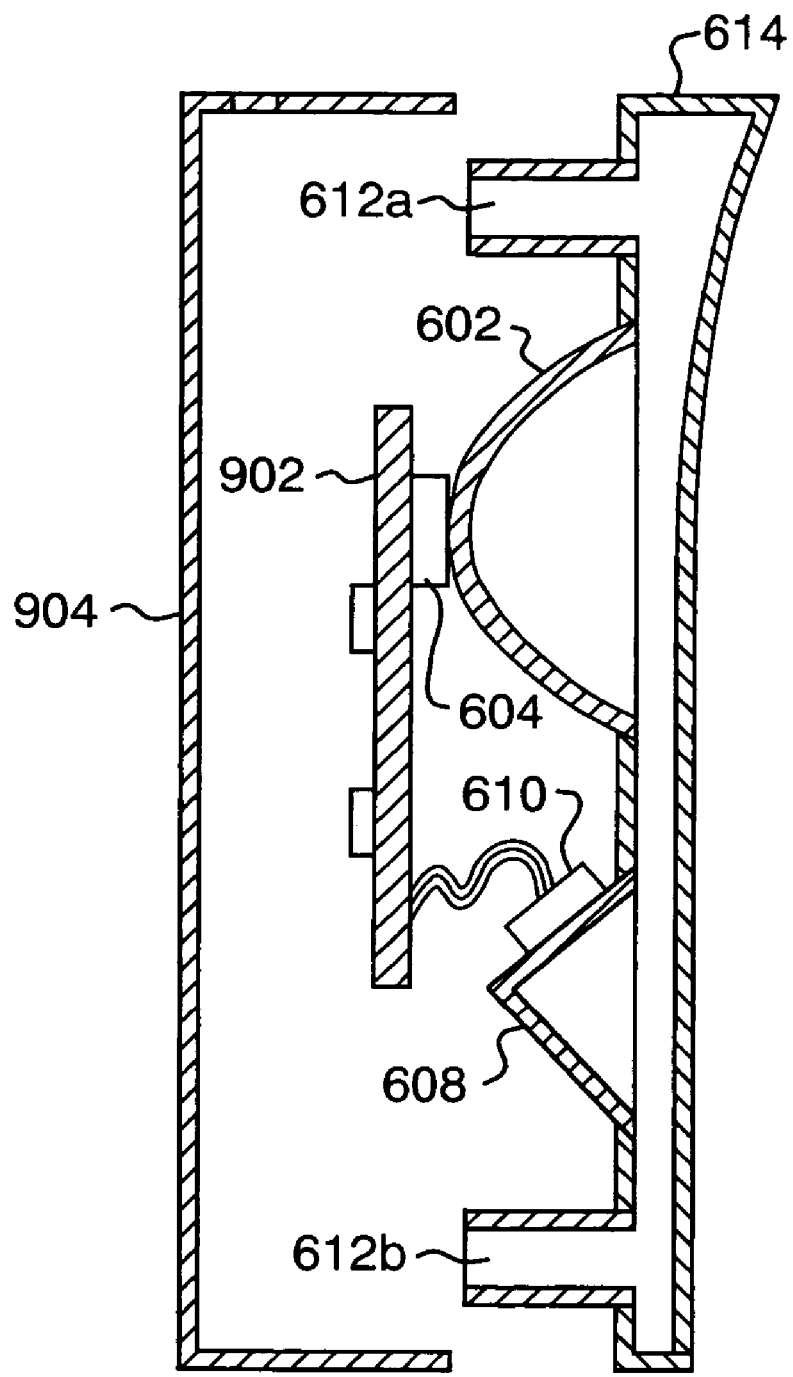
FIG. 9 is a cross-sectional side view of the nose-mounted cargo detector according to one embodiment of the invention.

FIG. 9 is a side view of the cargo sensor according to one embodiment of the invention. As illustrated, between the back panel 904 and the front panel 614, there is a sensor controller 902 connected to transducers 610 and 604. A long range transducer 604 is mounted within an elliptical cone 602, and short range transducer 610 is mounted at a downward angle, pointing towards the floor. The openings 612a-b facilitate the air flow within the sensor, so that air temperature and humidity may be more accurately measured.

Figure 10:
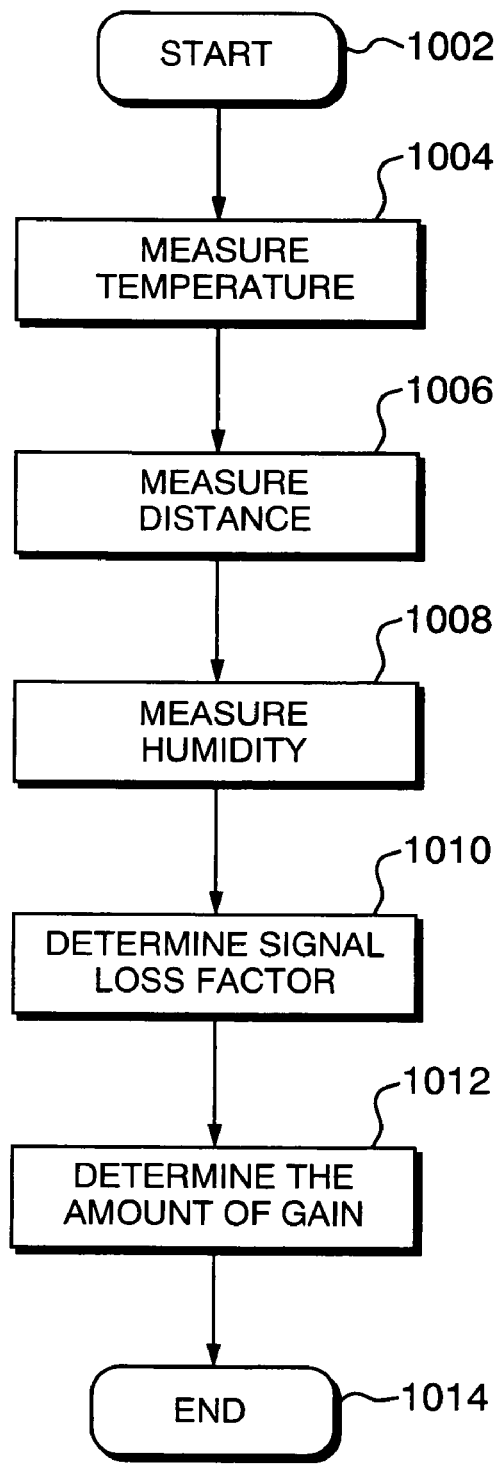
FIG. 10 is a flow chart illustrating how atmospheric conditions are used to adjust sensor gain.

FIG. 10 is a flow chart illustrating operation of the atmospheric absorption compensation module. The atmospheric absorption compensation module determines the signal amplification necessary to compensate for the air conditions based on a set of measurements provided by various sensors.

The ambient temperature is measured in step 1004 by taking a reading of the temperature sensor 704. The temperature is critical in that it is a significant factor in the speed of sound which, in turn, affects the sensors ability to measure distance to the back wall of the trailer.

Figure 11:
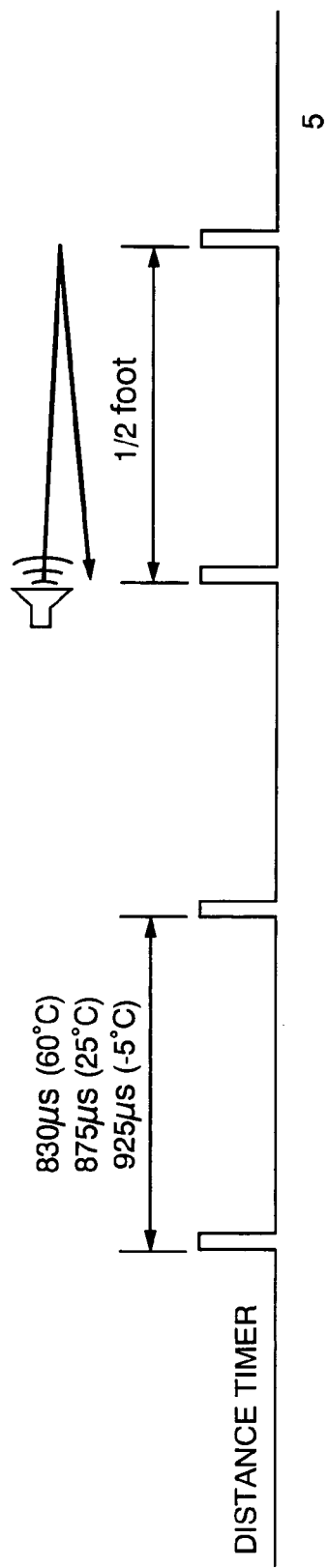
FIG. 11 is a timing diagram for taking distance measurements.

The distance is measured in step 1006 using a distance timer. The distance timer is an interrupt set to a rate that corresponds to the amount of time (based on speed of the sound) for a signal to travel and return through a predetermined distance, for example, through ½ foot. FIG. 11 is a timing diagram for distance measurement. The interrupt is used to determine the distance that the sound has traveled when evaluating return response.

The relative humidity of the air may be determined in step 1008 by sampling the analog voltage across the humidity sensor 706. The received may then be adjusted for accuracy over temperature.

In general, the atmospheric absorption is affected by air temperature, humidity and the frequency of the signal. Additional factors such as, for example, the atmospheric pressure, may also affect the atmospheric absorption, and in an alternative embodiment of the invention, additional sensors may be employed to sense those factors.

The signal loss due to atmospheric conditions is calculated in step 1010. In order to calculate the signal loss factor, pre-calculated tables may be employed. For example, two-dimensional tables may specify the amount of signal loss per half a foot for specific values of temperature and relative humidity. There may be different tables for different frequencies, for example, one table for the long range sensing (25 kHz), and another one for the short range sensing (40 kHz). A 2-dimensional interpolation between the table values may be performed to determine the expected signal loss for the measured environmental conditions.

In step 1012, the loss factor is accumulated at the distance timer rate to determine the amount of gain necessary for the returned signal. The transmitted signal may then be amplified based on the calculated necessary gain.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for detecting an object in a trailer comprising:

a long-range sensor mounted along a nose wall of the trailer;

an atmospheric absorption compensation module connected to the long-range sensor; and a power source electrically connected to the sensor; wherein:

the atmospheric absorption compensation further comprises at least one sensor sensing one or more atmospheric conditions; and the atmospheric conditions comprise air humidity.

2. The apparatus of claim 1, further comprising:

one or more openings to facilitate sensing of at least one atmospheric condition.

3. The method of claim 1:

wherein the atmospheric condition further comprises air temperature.

4. The apparatus of claim 1, wherein the atmospheric absorption compensation module further comprises controls for amplifying sensor signal.

5. The apparatus of claim 1, wherein the atmospheric absorption compensation module further comprises a processor for calculating effects of atmospheric absorption on ultrasonic signal.

* * * * *